Jan. 21, 1930.   W. H. F. SCHMIEDING   1,744,283
ELECTRIC APPARATUS
Filed May 28, 1925

Inventor
Warren H. F. Schmieding
By Spencer, Duvall and Hardman
his Attorneys

Patented Jan. 21, 1930

1,744,283

UNITED STATES PATENT OFFICE

WARREN H. F. SCHMIEDING, OF DAYTON, OHIO, ASSIGNOR TO DELCO-LIGHT COMPANY, OF DAYTON, OHIO, A CORPORATION OF DELAWARE

ELECTRIC APPARATUS

Application filed May 28, 1925. Serial No. 33,439.

The present invention relates to electrical systems, and particularly to that type comprising generating means adapted to supply current to a work circuit at a certain voltage and supply current to a battery for charging same at a higher voltage. In this type of invention, the generating means is usually adapted to function as a motor for driving a prime mover which in turn will drive the generating means when it becomes self-operative.

One of the objects of the present invention is to control a system of the above type in a manner so that the voltage across the work circuit is maintained substantially constant during those periods when the generating means is operative or inoperative and during that period while the speed of the prime mover is decreasing after the system has operated to render the prime mover inoperative to drive the generating means.

Another object of the present invention is to provide a system of the above type in which the generating means functions as a motor to drive the prime mover at the work circuit or battery voltage and after the prime mover has become self operative and drives the generating means at such a speed that the voltage thereof is substantially the same as the battery voltage, to then render the system operative to supply current to the battery at a relatively higher voltage for charging the battery.

Further objects and advantages of the present invention will be apparent from the following description, reference being had to the accompanying drawings, wherein a preferred form of embodiment of the present invention is clearly shown.

Figure 1:
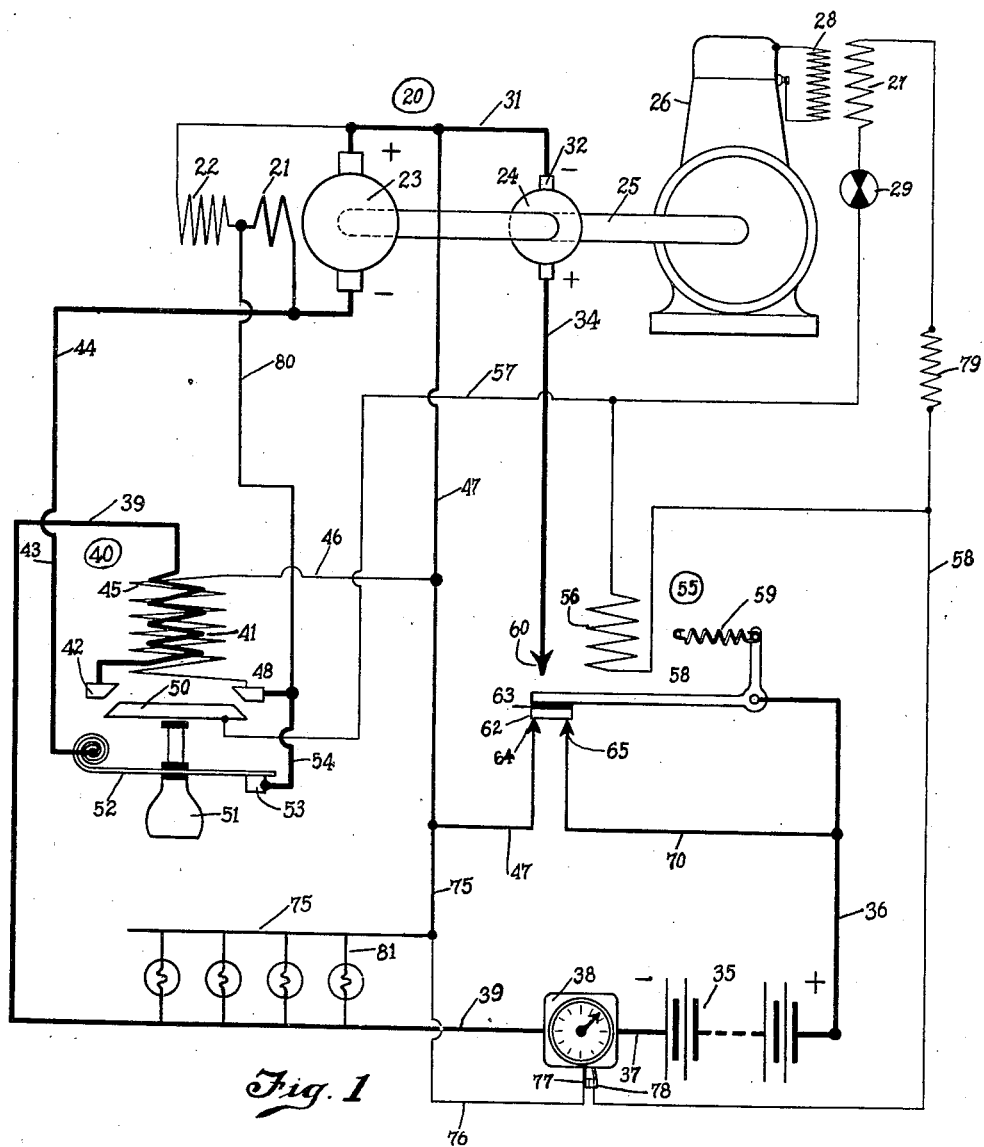
Fig. 1 is a diagrammatic view of the improved system.

Referring to the drawings, there is shown, a dynamo 20 comprising a series winding 21 and a shunt winding 22 providing field windings for armatures 23 and 24, which are carried by a shaft 25. As is well understood, armatures 23 and 24 can be combined into one armature with two separate windings and commutators. Shaft 25 is driven by a prime mover herein shown as an internal combustion engine 26 provided with an ignition coil including primary winding 27 and secondary winding 28 and provided with a timer 29 for controlling the circuit for the primary winding. The positive brush for armature 23 is connected by a wire 31 with the negative brush for armature 24. The negative brush for armature 23 is connected through winding 21 with a wire 33 and the positive brush for armature 24 is connected with a wire 34.

The storage battery for the system is shown at 35 connected at its positive terminal with a wire 36 and at its negative terminal with a wire 37. Wire 37 is connected with an ampere-hour-meter 38. The other side of the meter is connected with a wire 39.

A starting switch 40 for connecting the battery 35 with the dynamo 20 includes a series winding 41 connected at one end with a contact 42 and at its other end with wire 39. A shunt winding 45 is connected at its one end by a wire 46 to a wire 47 which is connected with wire 31, and the other end of winding 45 is connected with a contact 48. Contacts 42 and 48 are adapted to be bridged by an armature 50 which is adapted to be held in attracted position by the windings 41 and 45. Armature 50 is movable into circuit closing position by a handle 51. Switch 40 also includes a spring-pressed contact 52 normally held under spring tension in contact with a contact 53 which is connected with contact 48 by wire 54. Contact 52 is connected directly with the negative brush of armature 23 by wire 44. Handle 51 is connected with contact 52 in such a manner that when said handle is actuated to move the armature 50 to its circuit closing position, it will move contact 52 out of engagement with contact 53. Handle 51 is movable independent of the armature in its opposite direction so that after the armature is attracted, handle 51 may return by gravity to its normal position in which contact is re-established between contacts 52 and 53. The return movement of handle 51 and contact 52 is augmented by the resiliency of contact 52.

Figure 2:
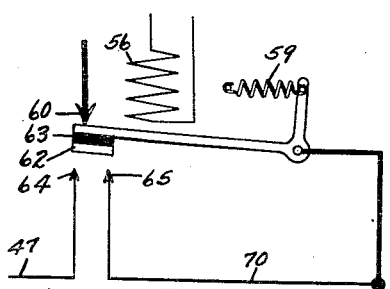
Fig. 2 is a diagrammatic view of one of the controllers in another position from that shown in Fig. 1.

A relay or controller 55 includes a winding 56 connected at one end by a wire 57 with armature 50 of switch 40, and at its other end with a wire 58. When the ampere turns of winding 56 reaches a certain value, a pivotally mounted armature 58 is moved from the position shown in Fig. 1 to the position shown in Fig. 2. A spring 59 normally tends to maintain the armature 58 in its unattracted position. Armature 58 is connected with the battery 35 by the wire 36 and is adapted, when attracted by the winding 56, to engage a contact 60 connected with dynamo armature 24 by wire 34. The underside of armature 58 carries a contact 62 which is insulated from the armature by insulation 63. When the armature 58 is in its unattracted position, contact 62 engages contacts 64 and 65 connected respectively with wires 47 and 70. Wire 70 is connected with wire 36.

The ignition primary circuit includes wire 75 connected with wire 47, wire 76, contacts 77 and 78 of meter 38, wire 58, ignition resistance 79, primary winding 27, timer 29, wire 57 to armature 50. When the battery is fully charged, the contacts 77 and 78 are separated but when the battery is not fully charged, these contacts are closed. Winding 56 of controller 55 is arranged in parallel relation with the primary winding 27 of the ignition coil, it being connected between wires 58 and 57.

The shunt field winding 22 is connected across the brush of the armature 23 and the series field winding is connected at one end by wires 80 and 54 to contact 48, and at the other end with the negative brush of the armature 23.

The work circuit herein shown includes lights 81 which are adapted to receive current from the battery when the dynamo is not operating through the following circuit: battery 35, wires 36 and 70, contacts 65, 62 and 64, wires 47 and 75, lights 81, wire 39, meter 38, and wire 37 to the opposite side of the battery.

When it is desirable to charge the battery 35, handle 51 of switch 40 is moved to cause armature 50 to bridge contacts 48 and 42 and to separate contact 52 from contact 53 to establish the following cranking circuit: battery 35, wires 36 and 70, contacts 65, 62 and 64, wires 47 and 31, armature 23, series field winding 21, wires 80 and 54, contact 48, armature 50, contact 42, series winding 41, wire 39, meter 38, and to the opposite side of the battery by wire 37. The shunt field winding will also be energized since it is connected across the brushes of armature 23. A circuit will also be completed through the shunt winding 45 of controller 40 as follows: wire 46 connected with wire 47 on the positive side of the battery, winding 45, and contact 48 which is connected on the negative side of the battery through armature 50. The ignition primary circuit and the circuit through winding 56 of controller 55 will also be completed since these circuits are connected by wire 76 to wire 47 on the positive side of the battery and by wire 57 through armature 50 on the negative side of the battery.

When current is flowing from the battery to the dynamo, during the cranking operation, i. e. while the dynamo functions as a motor, windings 41 and 45 produce opposite magnetic effects. However, when the engine 26 becomes self operative, it will drive the dynamo 20 whereby said dynamo will function as a generator and when the ampere turns of the winding 41 are reduced to a certain low value or when the flux created by the winding 41 cooperates with the flux created by winding 45, armature 50 will be held magnetically in its circuit closing position. As long as the handle 51 is held in the starting position, the dynamo 20 will function as a differentially wound generator, but, after the dynamo functions as a generator and the armature 50 is held magnetically in circuit closing position, the handle can be released. When the handle is released contact 52 will engage contact 53 to connect wire 44, contacts 52 and 53, and wire 54 in parallel with series field 21 and wire 80, the resistance being less in the first mentioned circuit, therefore the series field winding 21 will be short-circuited and the dynamo will function as a shunt wound generator.

After the aforementioned function takes place, the voltage across the armature 23 will rise quickly and when said voltage has reached a predetermined value, sufficient ampere turns will be created by the winding 56 of controller 55 so that armature 58 will be attracted. This movement of the armature 58 will cause contact 62 to separate from contacts 64 and 65 and cause armature 58 to engage contact 60 to establish the following battery charging circuit: armature 23, wire 31, armature 24, wire 34, contact 60, armature 58 of controller 55, wire 36, battery 35, wire 37, meter 38, wire 39 which in turn is connected through the switch 40 with the opposite side of the dynamo armature 23. Thus dynamo armatures 23 and 24 are connected in series relation to charge the battery at a relatively high voltage. Since contact 62 of controller 55 separates from contacts 64 and 65 before armature 58 engages contact 60, the higher voltage current from the armature 23 and 24 cannot flow from wire 70 to the work circuit.

During the generating operation, relatively low voltage current is supplied to the work circuit by the dynamo through the following circuit: dynamo armature 23, wires 31, 47 and 75, lights 81, to wire 39 on the opposite side of the system.

When the battery 35 is fully charged, the meter 38 will separate contacts 77 and 78 to break the circuit to the windings 56 of controller 55 and break the ignition circuit. When the winding 56 is de-energized it will return to the position shown in Fig. 1 to disconnect the battery from the relatively high voltage circuit of the dynamo and connect the work circuit to the battery through contacts 65, 62 and 64 as previously described. As the speed of the engine 26 and likewise as the output of the dynamo changes to affect the switch 40, the armature 50 thereof will move from its attracted position to disconnect the dynamo from the battery.

Thus it will be seen that a system is disclosed in which the voltage across the work circuit is substantially constant during the entire cycle of operation of the system. The voltage across the armature 23 is substantially the same as the voltage across the battery and since the work circuit receives current only from the battery and from the armature 23 and is not affected by the relatively higher voltage for battery charging purposes, the voltage impressed across the work circuit is substantially constant. Since the work circuit is not disconnected from the battery until the voltage across the armature is substantially the same as the voltage of the battery, the work circuit will receive current at battery voltage when contact 62 separates from contacts 64 and 65. Likewise, at the time when the circuit to winding 56 of controller 55 is broken at 77, 78 the voltage across the armature 23 is substantially the same as the battery voltage and when this circuit is broken, contact 62 will substantially immediately reengage contacts 64 and 65 whereby to complete the work circuit connections with the battery before the voltage across the armature 23 has decreased to a material degree.

While the form of embodiment of the present invention as herein disclosed, constitutes a preferred form, it is to be understood that other forms might be adopted, all coming within the scope of the claims which follow.

What is claimed is as follows:

1. An electrical system, comprising in combination, a work circuit, a storage battery adapted to be connected with the work circuit, a prime mover, current generating means including circuits at two different voltages for energizing the work circuit at a certain voltage and for charging said battery at a higher voltage, said means being adapted to be driven by the prime mover and adapted to function as a motor for rendering the prime mover self-operative, a controller for connecting the battery to said means for causing said means to operate as a motor, said controller including an electromagnet for maintaining the work circuit and battery connected with the lower voltage generating means when said prime mover is self-operative, and a second controller rendered operable by the first named controller, said second controller having a member movable to a certain position to connect the battery with the higher voltage generating means to charge said battery, said member being movable to another position for disconnecting the higher voltage generating means from the battery and for connecting the battery with the work circuit, and means responsive to the state of battery charge for controlling said second controller.

2. An electrical system, comprising in combination, a work circuit, a storage battery adapted to be connected with the work circuit, a prime mover, current generating means including circuits at two different voltages for energizing the work circuit at a certain voltage and for charging said battery at a higher voltage, said means being adapted to be driven by the prime mover and adapted to function as a motor for rendering the prime mover self-operative, a controller for connecting the battery to said means for causing said means to operate as a motor, said controller including an electromagnet for maintaining the work circuit and battery connected with the lower voltage generating means when said prime mover is self-operative, and a second controller rendered operable by the first named controller, said second controller having a member movable to a certain position when the voltage of said lower voltage generating means attains a certain value to connect the battery with the higher voltage generating means to charge said battery, said member being movable to another position for disconnecting the higher voltage generating means from the battery and for connecting the battery with the work circuit, and means responsive to the state of battery charge for controlling the second controller whereby said member will move to said second mentioned position.

3. An electrical system, comprising in combination, a work circuit, a storage battery adapted to be connected with the work circuit, a prime mover, current generating means including circuits at two different voltages for energizing the work circuit at a certain voltage and for charging said battery at a higher voltage, said means being adapted to be driven by the prime mover and adapted to function as a motor for rendering the prime mover self-operative, a controller for connecting the battery to said means for causing said means to operate as a motor, said controller including an electromagnet for maintaining the work circuit and battery connected with the lower voltage generating means when said prime mover is self-operative, and a second controller including an electro-magnet winding adapted to be energized when the first mentioned controller is in circuit making position, said second controller including a member adapted to be moved when the winding is energized to a certain position to connect the battery with the higher voltage generating means whereby to charge the battery, said member being movable to another position for disconnecting the higher voltage generating means from the battery and for connecting the battery with the work circuit when the winding is rendered inoperative, and means responsive to the state of battery charge for rendering said winding inoperative.

4. An electric system, comprising in combination, a work circuit, a storage battery adapted to be connected with the work circuit, a prime mover, current generating means including circuits at two different voltages for energizing the work circuit at a certain voltage and for charging said battery at a higher voltage, said means being adapted to be driven by the prime mover and adapted to function as a motor for rendering the prime mover self-operative, a controller for connecting the battery to said means for causing said means to operate as a motor, said controller including an electro-magnet for maintaining the work circuit and battery connected with the lower voltage generating means when said prime mover is self-operative, and a second controller including a voltage winding rendered operable when the first mentioned controller is in circuit making position, said controller including a member adapted to be moved, when the voltage of the lower voltage generating means attains a certain value, to a certain position to connect the battery with the higher voltage generating means whereby to charge the battery, said member being movable to another position for disconnecting the higher voltage generating means from the battery and for connecting the battery with the work circuit when the winding is rendered inoperative, and means responsive to the state of battery charge for rendering said winding inoperative.

5. An electrical system, comprising in combination, a work circuit; a storage battery; a prime mover; dynamo-electric means adapted to function as a motor for starting the prime mover and adapted to function as a generator when driven by the prime mover, said means including work energizing and battery charging circuits at two different voltages for energizing the work circuit at one voltage and for charging the battery at a different voltage; a connecting circuit for connecting the work circuit with the battery independent of the dynamo-electric means for supplying current from the battery to the work circuit when the prime mover is inoperative and during the starting operation; and control mechanism for controlling the connection between the battery and said dynamo-electric means and for substituting said work energizing circuit for said connecting circuit during the generating function of said dynamo-electric means.

6. An electrical system, comprising in combination, a work circuit; a storage battery adapted to be connected with the work circuit; a prime mover; dynamo-electric means adapted to function as a motor for rendering the prime mover operative and adapted to function as a generator driven by the prime mover, said means including circuits at two different voltages for energizing the work circuit at one voltage and for charging the battery at a different voltage; and control mechanism for controlling the connection between the storage battery, work circuit, and dynamo-electric means, said control mechanism being arranged to maintain the battery connected with the work circuit during the prime mover starting operation and arranged to cause the dynamo-electric means to supply current to the work circuit when said means functions as a generator, and including means for connecting the work circuit directly across the battery, independent of the dynamo-electric means, when the prime mover is inoperative.

7. An electrical system, comprising in combination, a work circuit; a storage battery adapted to be connected with the work circuit; a prime mover; dynamo-electric means adapted to function as a motor for rendering the prime mover operative and adapted to function as a generator driven by the prime mover, said means including circuits at two different voltages for energizing the work circuit at one voltage and for charging the battery at a different voltage; and control mechanism for controlling the connection between the storage battery, work circuit, and dynamo-electric means, said control mechanism being arranged to maintain the battery connected with the work circuit during the prime mover starting operation and arranged to cause the dynamo-electric means to supply current to the work circuit when said means functions as a generator, and means for disconnecting the battery from the battery charging circuit and for connecting the work circuit directly across the battery, independent of the dynamo-electric means, when the prime mover is inoperative.

In testimony whereof I hereto affix my signature.

WARREN H. F. SCHMIEDING.